(12) United States Patent
Wang et al.

(10) Patent No.: US 8,603,585 B2
(45) Date of Patent: Dec. 10, 2013

(54) METHOD FOR MAKING CARBON NANOTUBE COMPOSITE

(75) Inventors: Jia-Ping Wang, Beijing (CN); Qun-Feng Cheng, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 1078 days.

(21) Appl. No.: 12/246,353

(22) Filed: Oct. 6, 2008

(65) Prior Publication Data

US 2009/0155467 A1 Jun. 18, 2009

(30) Foreign Application Priority Data

Dec. 14, 2007 (CN) .......................... 2007 1 0125109

(51) Int. Cl.
| | |
|---|---|
| *B28B 7/38* | (2006.01) |
| *B05D 7/00* | (2006.01) |
| *B05D 3/00* | (2006.01) |
| *B05D 3/02* | (2006.01) |
| *B05D 1/18* | (2006.01) |

(52) U.S. Cl.
USPC ........ 427/294; 427/430.1; 427/133; 427/379; 427/384; 427/222

(58) Field of Classification Search
USPC ............. 427/77, 294, 299, 372.2, 430.1, 296, 427/133, 135, 379, 384, 385.5, 222; 977/742, 847
See application file for complete search history.

(56) References Cited

U.S. PATENT DOCUMENTS

| | | | |
|---|---|---|---|
| 4,942,013 A | * | 7/1990 | Palmer et al. ............. 264/511 |
| 6,099,906 A | * | 8/2000 | Palmer et al. ............. 427/296 |
| 6,808,746 B1 | | 10/2004 | Dai et al. |
| 7,396,477 B2 | | 7/2008 | Hsiao |
| 7,704,480 B2 | | 4/2010 | Jiang et al. |
| 2003/0039816 A1 | | 2/2003 | Wang et al. |
| 2003/0122111 A1 | | 7/2003 | Glatkowski |
| 2005/0228097 A1 | * | 10/2005 | Zhong .................. 524/430 |
| 2007/0004081 A1 | * | 1/2007 | Hsiao .................. 438/106 |
| 2007/0013287 A1 | * | 1/2007 | Huang et al. .............. 313/311 |
| 2008/0039555 A1 | * | 2/2008 | Ruyters et al. ............. 523/429 |
| 2009/0096346 A1 | | 4/2009 | Liu et al. |
| 2009/0117434 A1 | | 5/2009 | Liu et al. |

(Continued)

FOREIGN PATENT DOCUMENTS

| | | | |
|---|---|---|---|
| CN | 1699452 | | 11/2005 |
| CN | 1699452 A | * | 11/2005 |

(Continued)

OTHER PUBLICATIONS

Zhang et al; Strong, Transparent, Multifunctional, Carbon Nanotube Sheets; Science vol. 309 pp. 1215-1219; Aug. 19, 2005.*

(Continued)

*Primary Examiner* — Michael Wieczorek
(74) *Attorney, Agent, or Firm* — Altis Law Group, Inc.

(57) ABSTRACT

A method for making a carbon nanotube composite includes: forming a self-supporting carbon nanotube film structure; providing a hardenable liquid material; immersing the carbon nanotube film structure in the hardenable liquid material; and solidifying the hardenable liquid material to achieve a carbon nanotube composite.

16 Claims, 4 Drawing Sheets

(56) References Cited

U.S. PATENT DOCUMENTS

| | | |
|---|---|---|
| 2009/0153506 A1 | 6/2009 | Liu et al. |
| 2009/0153513 A1 | 6/2009 | Liu et al. |
| 2009/0159188 A1 | 6/2009 | Jiang et al. |
| 2009/0160799 A1 | 6/2009 | Jiang et al. |
| 2009/0272935 A1 | 11/2009 | Hata et al. |

FOREIGN PATENT DOCUMENTS

| | | |
|---|---|---|
| CN | 1893040 | 1/2007 |
| CN | 1982209 | 6/2007 |
| EP | 2037516 | 3/2009 |
| EP | 2061077 A2 | 5/2009 |
| JP | 2004526838 | 9/2004 |
| JP | 2004276478 | 10/2004 |
| JP | 2004538353 | 12/2004 |
| JP | 2005255985 | 9/2005 |
| JP | 2006147801 | 6/2006 |
| JP | 2007182352 | 7/2007 |
| JP | 2009091239 | 4/2009 |
| JP | 2009117354 | 5/2009 |
| JP | 2009146424 | 7/2009 |
| JP | 2009151781 | 7/2009 |
| JP | 2009151782 | 7/2009 |
| JP | 2009163729 | 7/2009 |
| TW | 483870 | 4/2000 |
| WO | WO 00/73204 | 12/2000 |
| WO | WO0276724 A1 | 3/2002 |
| WO | WO2007099975 | 9/2007 |

OTHER PUBLICATIONS

Jiang et al; Spinning and Processing Continuous Yarns from 4-Inch Wafer Scale Super-Aligned Carbon Nanotube Arrays; Advanded Materials 18 pp. 1505-1510; May 23, 2006.*

* cited by examiner

METHOD FOR MAKING CARBON NANOTUBE COMPOSITE

RELATED APPLICATIONS

This application is related to commonly-assigned applications entitled, "METHOD FOR MAKING CARBON NANOTUBE COMPOSITE", filed Oct. 6, 2008 Ser. No. 12/246,356; and "CARBON NANOTUBE-BASED COMPOSITE MATERIAL AND METHOD FOR FABRICATING THE SAME", filed Oct. 6, 2008 Ser. No. 12/246,340. The disclosures of the above-identified applications are incorporated herein by reference.

BACKGROUND

1. Field of the Invention

The present invention relates to methods for making composites and, particularly, to a method for making a carbon nanotube (CNT) composite.

2. Discussion of Related Art

Carbon nanotubes (CNTs) are novel carbonaceous materials and have received a great deal of interest since the early 1990s. Carbon nanotubes have interesting and potentially useful heat conducting, electrical, and mechanical properties. Due to these and other properties, an important application for CNTs is their use as fillers in composite materials.

A conventional method of making a carbon nanotube composite includes the following steps: (a) providing 0.3 units of multi-wall carbon nanotubes by weight and 10 units of concentrated nitric acid by weight, placing the multi-wall carbon nanotubes into the concentrated nitric acid to form a mixture, agitating the mixture for 20 hours at a temperature of 200° C., removing the concentrated nitric acid from the multi-wall carbon nanotubes with distilled water, and drying the multi-wall carbon nanotubes in a vacuum for 10 hours at a temperature of 90° C.; (b) placing the multi-wall carbon nanotubes into 10 units of oxalyl chloride by weight to form a mixture, agitating the mixture for 10 hours at a temperature of 90° C., and vaporizing the unreactive oxalyl chloride; (c) placing the multi-wall carbon nanotubes into ice to form a mixture, agitating the mixture slowly, dripping 10 units of diaminoethane by weight, and drying the multi-wall carbon nanotubes in a vacuum for 10 hours at a temperature of 100° C.; (d) placing the multi-wall carbon nanotubes into 20 units of ethanol by weight to form a mixture, cleaning the mixture ultrasonically, adding 2 units of epoxide resin by weight into the mixture, agitating the mixture rapidly for 20 minutes, vaporizing the ethanol, heating the mixture to a temperature of 60° C., adding a solidifying agent into the mixture, and dispersing the multi-wall carbon nanotubes uniformly; and (d) placing the mixture into a die, heating the mixture to a temperature of 80° C., solidifying the mixture for 2 hours, heating the mixture to a temperature of 150° C., solidifying the mixture for 2 hours, and finally obtaining the carbon nanotube composite.

However, the above method can lead to some disadvantages. Firstly, in step (c), it is often difficult to uniformly disperse the carbon nanotubes into the mixture, which can result in high costs. Secondly, in step (a), the process of placing the carbon nanotubes into the concentrated nitric acid is liable damage the integrity of the carbon nanotubes.

What is needed, therefore, is to provide a low-cost method for making a carbon nanotube composite without damaging the integrality of the carbon nanotubes.

SUMMARY

A method for making a carbon nanotube composite includes the following steps: forming a self-supporting carbon nanotube film structure; providing a hardenable liquid material; immersing the carbon nanotube film structure in the hardenable liquid material; and solidifying the hardenable liquid material to achieve a carbon nanotube composite.

Other novel features and advantages of the present method for making a carbon nanotube composite will become more apparent from the following detailed description of preferred embodiments when taken in conjunction with the accompanying drawings.

BRIEF DESCRIPTION OF THE DRAWINGS

Many aspects of the present method for making a carbon nanotube composite can be better understood with reference to the following drawings. The components in the drawings are not necessarily drawn to scale, the emphasis instead being placed upon clearly illustrating the principles of the present method for making a carbon nanotube composite.

Figure 1:
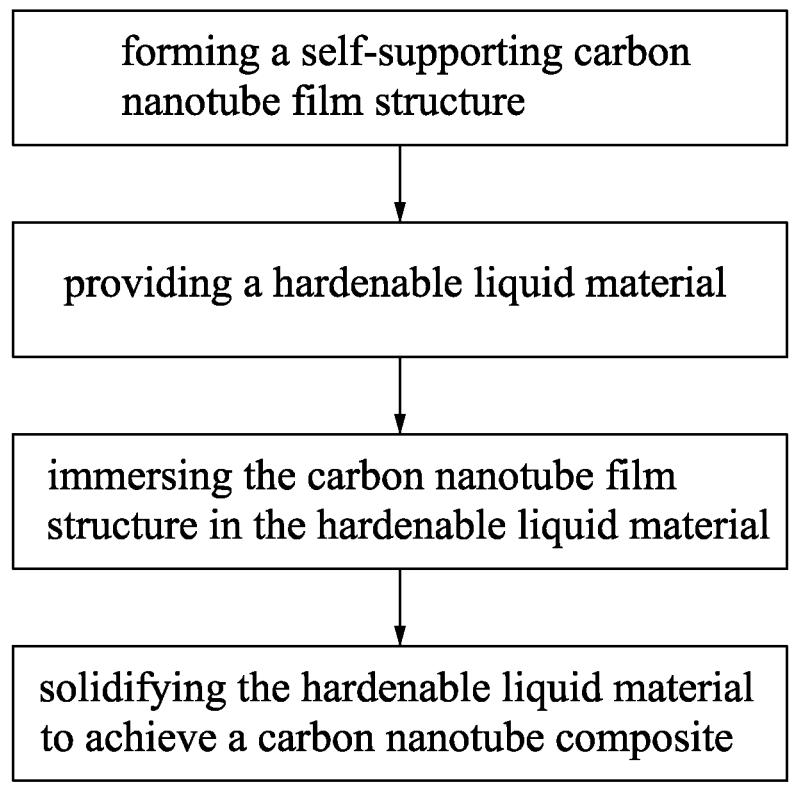
FIG. 1 is a flow chart of a method for making a carbon nanotube film composite in accordance with an exemplary embodiment.

Corresponding reference characters indicate corresponding parts throughout the several views. The exemplifications set out herein illustrate at least one preferred embodiment of the method for making a carbon nanotube composite, in at least one form, and such exemplifications are not to be construed as limiting the scope of the invention in any manner.

DETAILED DESCRIPTION OF EXEMPLARY EMBODIMENTS

References will now be made to the drawings to describe, in detail, embodiments of the method for making a carbon nanotube composite.

Referring to FIG. 1, an exemplary method for making a carbon nanotube composite includes: (a) forming a self-supporting carbon nanotube film structure; (b) providing a hardenable liquid material; (c) immersing the carbon nanotube film structure in the hardenable liquid material; and (d) solidifying the hardenable liquid material to achieve a carbon nanotube composite.

In step (a), the self-supporting carbon nanotube film can be formed by the following substeps: (a1) providing a substrate with a super-aligned array of carbon nanotubes formed thereon; (a2) pulling out at least one carbon nanotube film from the array of carbon nanotubes via a pulling tool (e.g., adhesive tape or another tool allowing multiple carbon nanotubes to be gripped and pulled simultaneously); and (a3) forming a carbon nanotube film structure with the carbon nanotube films.

The super-aligned array of carbon nanotubes can be approximately 200 microns to 900 microns in height, and includes a plurality of carbon nanotubes parallel to each other and substantially perpendicular to the substrate. The super-aligned array of carbon nanotubes formed under the above conditions is essentially free of impurities, such as carbonaceous or residual catalyst particles. The carbon nanotubes in the super-aligned array are packed together closely by van der Waals attractive force.

In step (a1), a given super-aligned array of carbon nanotubes can be formed by the substeps of: (a11) providing a substantially flat and smooth substrate; (a12) forming a catalyst layer on the substrate; (a13) annealing the substrate with the catalyst layer at a temperature approximately ranging from 700° C. to 900° C. in air for about 30 to 90 minutes; (a14) heating the substrate with the catalyst layer at a temperature approximately ranging from 500° C. to 740° C. in a furnace with a protective gas therein; and (a15) supplying a carbon source gas into the furnace for about 5 to 30 minutes and growing a super-aligned array of the carbon nanotubes from the substrate.

In step (a11), the substrate can be a P-type silicon wafer, an N-type silicon wafer, or a silicon wafer with a film of silicon dioxide thereon. In the presently described embodiment, a 4-inch P-type silicon wafer is used as the substrate.

In step (a12), the catalyst can be made of iron (Fe), cobalt (Co), nickel (Ni), or any alloy thereof.

In step (a14), the protective gas can be made up of at least one of the following: nitrogen ($N_2$), ammonia ($NH_3$), and noble gas. In step (a15), the carbon source gas can be a hydrocarbon gas, such as ethylene ($C_2H_4$), methane ($CH_4$), acetylene ($C_2H_2$), ethane ($C_2H_6$), or any combination thereof.

In step (a2), the carbon nanotube film can be drawn from the super-aligned array of carbon nanotubes by the following substeps: (a21) selecting a plurality of carbon nanotube segments having a predetermined width; and (a22) drawing the carbon nanotube segments at an even/uniform speed to form the carbon nanotube film.

In step (a21), the carbon nanotube segments having a predetermined width can be selected by using a wide adhesive tape to contact the super-aligned array. In step (a22), the drawing direction is substantially perpendicular to the growing direction of the super-aligned array of carbon nanotubes.

More specifically, during the drawing process, as the initial carbon nanotube segments are drawn out, other carbon nanotube segments are also drawn out end-to-end due to van der Waals attractive force between ends of adjacent segments. This process of drawing ensures a successive carbon nanotube film can be formed. The carbon nanotubes of the carbon nanotube film are all substantially parallel to the drawing direction, and the carbon nanotube film produced in such manner is able to have a selected width.

The width of the carbon nanotube film depends on the size of the carbon nanotube array. The length of the carbon nanotube film is arbitrary. In this embodiment, when the size of the substrate is 4 inches, the width of the carbon nanotube film approximately ranges from 1 centimeter to 10 centimeters, and the thickness of the carbon nanotube film approximately ranges from 0.01 microns to 100 microns.

Step (a3) is carried out by stacking at least two carbon nanotube films. Each carbon nanotube film includes a plurality of carbon nanotubes arranged along the drawing direction. At least two carbon nanotube films are stacked one on top of another. Each carbon nanotube film comprises a plurality of carbon nanotubes oriented along one direction, and an angle between the alignment directions of the carbon nanotubes in any two adjacent carbon nanotube films ranges from 0° to 90°. The angle is determined by the difference in the two drawing directions of the adjacent carbon nanotube films.

The carbon nanotube film structure includes at least two carbon nanotube films. Each carbon nanotube film includes a plurality of carbon nanotube segments joined successively end-to-end by van der Waals attractive force therebetween. Each carbon nanotube segment includes a plurality of carbon nanotubes closely arranged parallel to each other. The carbon nanotubes in the segments have substantially the same length and are arranged substantially in the same direction. The alignment directions of the carbon nanotubes in any two adjacent carbon nanotube layers form an angle α, where 0≤α≤90°. The adjacent carbon nanotube films are combined by van der Waals attractive force to form a stable carbon nanotube film structure. It is to be understood that there can be some variation in the carbon nanotube structures.

The width of each carbon nanotube film depends on the size of the carbon nanotube array. The length of the carbon nanotube film is arbitrary. In this embodiment, when the size of the substrate is 4 inches, the width of the carbon nanotube film approximately ranges from 1 centimeter to 10 centimeters, and the thickness of the carbon nanotube film approximately ranges from 0.01 microns to 100 microns. The carbon nanotubes of the carbon nanotube film can be selected from a group comprising of single-wall carbon nanotubes, double-wall carbon nanotubes, multi-wall carbon nanotubes, and any combination thereof. A diameter of the carbon nanotubes approximately ranges from 0.5 nanometers to 50 nanometers.

In this embodiment, the method can further include an additional step (e) of treating the carbon nanotube film structure 12 with an organic solvent after step (a).

In step (e), the organic solvent is volatilizable, and can be selected from the group comprising of ethanol, methanol, acetone, dichloroethane, chloroform, and any combination thereof. The carbon nanotube film structure 12 can be treated by either of two methods: dripping the organic solvent from a dropper to soak the carbon nanotube film structure 12; or immersing the carbon nanotube film structure 12 into a container filled with the organic solvent. After being soaked by the organic solvent, microscopically, carbon nanotube strings will be formed by some adjacent carbon nanotubes bundling together, due to the surface tension of the organic solvent. In one aspect, due to the decrease of the specific surface area via bundling, the mechanical strength and toughness of the carbon nanotube film structure 12 are increased and the coefficient of friction of the carbon nanotube film structure 12 is reduced. Macroscopically, the carbon nanotube film structure 12 will be an approximately uniform carbon nanotube film.

Figure 2:
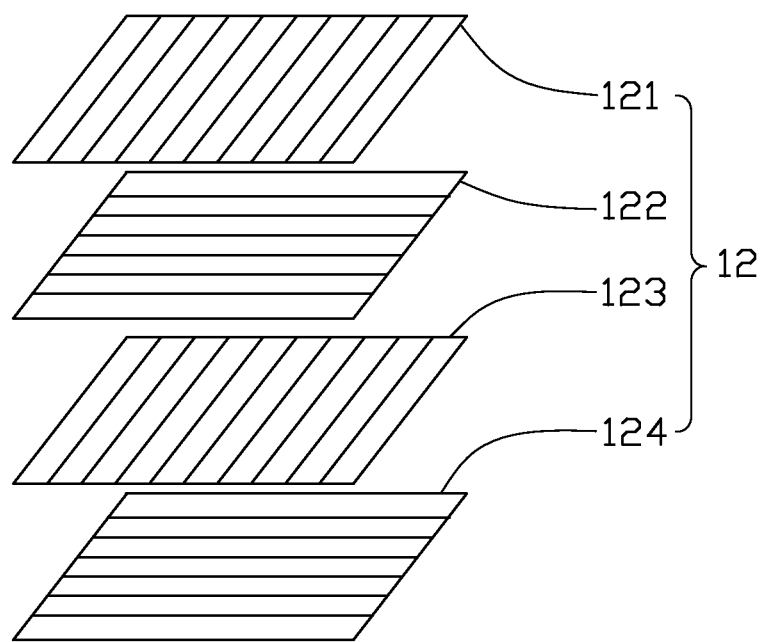
FIG. 2 is a schematic, exploded, isometric view of a carbon nanotube film structure in accordance with an exemplary embodiment.

Referring to FIG. 2, in this embodiment, the carbon nanotube film structure 12 includes a first carbon nanotube film 121, a second carbon nanotube film 122, a third carbon nanotube film 123, and a fourth carbon nanotube film 124. The carbon nanotubes in each carbon nanotube film 121, 122, 123, 124 are aligned. An angle between the alignment directions of the carbon nanotubes in any two adjacent carbon nanotube films 121, 122, 123, 124 is 90°. The four carbon nanotube films 121, 122, 123, 124 are combined by van der Waals attractive force, with each subsequent carbon nanotube film 122, 123, 124 being deposited directly on a preceding carbon nanotube film 121, 122, 123 to form the stable carbon nanotube film structure 12. The carbon nanotubes in each two adjacent of the four carbon nanotube films 121, 122, 123, 124 cross each other, whereby the carbon nanotube film structure 12 has a microporous structure. The diameters of the micropores approximately range from 1 nanometer to 0.5 microns.

In step (b), the hardenable liquid material is a liquid-state thermosetting polymer. The liquid-state thermosetting polymer can be fabricated by the following substeps: (b1) providing a polymer in a container, and heating and agitating the polymer at a temperature of less than 300° C.; (b2) adding at least one additive (see below) into the polymer; and (b3) heating and uniformly agitating the polymer with the at least one additive at a temperature of less than 300° C., thereby obtaining the liquid-state thermosetting polymer.

In this embodiment, the method of fabricating the liquid-state thermosetting polymer includes: (b1) providing a mixture of epoxy resin of glycidyl ether and epoxy resin of glycidyl fat disposed in a container, heating the mixture to a temperature ranging from 30° C. to 60° C., and agitating the mixture for 10 minutes; (b2) adding aliphatic amine and diglycidyl ether to the mixture; and (b3) heating the mixture to a temperature ranging from 30° C. to 60° C., and obtaining a liquid-state thermosetting polymer comprising epoxy resin.

A viscosity of the liquid-state thermosetting polymer is less than 5 pascal-seconds (Pa·s), which can be kept at room temperature for at least 30 minutes. The liquid-state thermosetting polymer includes polymer and at least one additive. The at least one additive is selected from a group comprising of solidifying agent, modifying agent, diluting agent, filler, and any combination thereof. A mass ratio of the polymer to the additive can approximately range from 7:3 to 19:1.

The liquid-state thermosetting polymer is selected from a group comprising of phenolic resin, epoxy resin, bismaleimide resin, triazine resin, polyimide, and polymethyl methacrylate. The solidifying agents are selected from a group comprising of aliphatic amine, aliphatic cyclic amine, aromatic amine, polyamide, acid anhydride, tertiary amine, and any combination thereof, and are ultimately used to accelerate the process of solidifying the liquid-state thermosetting polymer. The modifying agents are selected from a group comprising of polysulphide rubber, polyamide resin, acrylonitrile rubber, and any combination thereof, and are ultimately used to improve the property of the liquid-state thermosetting polymer. The diluting agents are selected from a group comprising of diglycidyl ether, polyglycidyl ether, butyl epoxy propyl ether 660, allylphenol, and any combination thereof. The fillers are selected from a group comprising of asbestos fiber, glass fiber, quartz powder, aluminum oxide, and any combination thereof, and are ultimately used to improve the heat-dissipation of the liquid-state thermosetting polymer.

Figure 3:
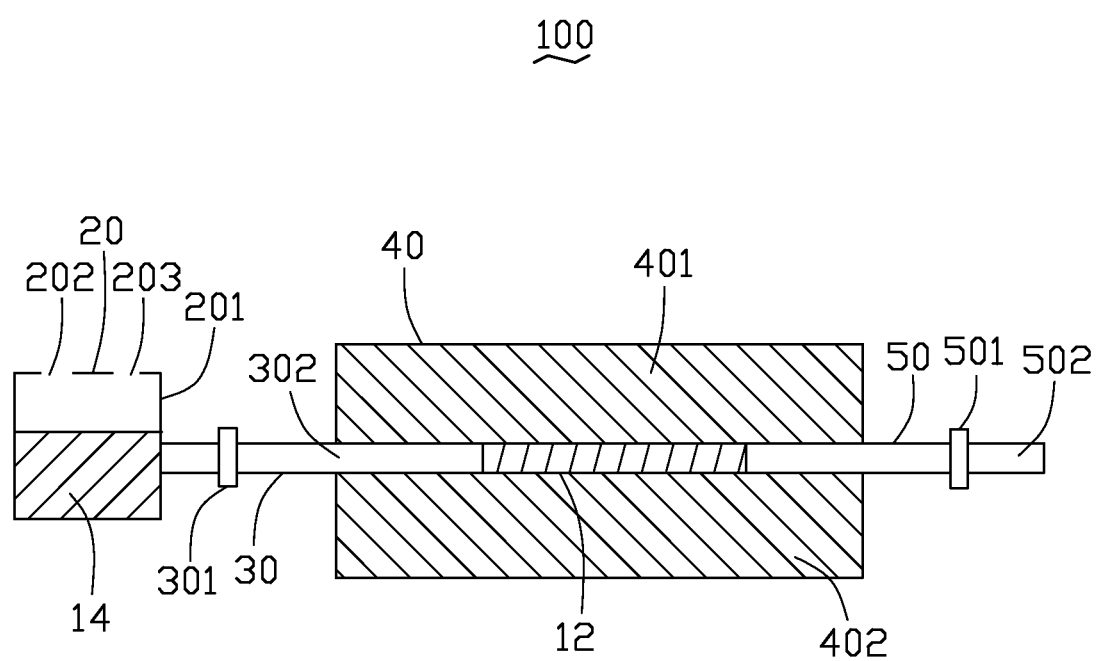
FIG. 3 is a schematic, side cross-sectional view of an apparatus for making a carbon nanotube composite in accordance with an exemplary embodiment, together with a carbon nanotube film.

In step (c), referring to FIG. 3, an apparatus 100 is provided to combine the carbon nanotube film structure 12 and the hardenable liquid material 14. The apparatus 100 includes a material supply device 20, a material input device 30, a die 40, and a material output device 50. The material supply device 20 includes a container 201 with a first inlet 202 and a second inlet 203. The first inlet 202 is used to remove air out from and thereby create a vacuum in the container 201. The second inlet 203 is used to apply pressure upon the hardenable liquid material 14. The material input device 30 includes a first valve 301 and a third inlet 302. The first valve 301 is used to control an input of the hardenable liquid material 14. The third inlet 302 is used to inject the hardenable liquid material 14 into the die 40. The die 40 includes an upper die 401 and a lower die 402. A stripping agent is coated on the upper die 401 and lower die 402 respectively. The material output device 50 includes a second valve 501 and an outlet 502. The second valve 501 is used to control an output of the hardenable liquid material 14. The outlet 502 is used to eject the hardenable liquid material 14 out of the apparatus 100.

In this embodiment, the method of immersing the carbon nanotube film structure 12 in the hardenable liquid material 14 using the apparatus 100 includes the following steps: (c1) disposing the carbon nanotube structure 12 in the die 40; (c2) injecting the hardenable liquid material 14 into the container 201, removing air from the container 201 to create a vacuum therein, and applying injection pressure upon the hardenable liquid material 14; and (c3) injecting the hardenable liquid material 14 into the die 40, and thereby immersing the carbon nanotube film structure 12 in the hardenable liquid material 14.

In step (c1), the carbon nanotube film structure 12 is disposed in the die 40 by the following substeps: (c11) coating a stripping agent on the upper die 401 and lower die 402 respectively; (c12) disposing the carbon nanotube film structure 12 on the lower die 402; and (c13) disposing the upper die 401 on the lower die 402, and hermetically sealing (and airproofing) the die 40 with a hermetic gasket or seal.

In step (c2), the hardenable liquid material 14 is disposed in the container 201 by the following substeps: (c21) closing the first valve 301 of the material input device 30 and the second valve 501 of the material output device 50; (c22) disposing the hardenable liquid material 14 in the container 201 of the material supply device 20; (c23) removing air from the container 201 via the first inlet 202 of the material supply device 20 to create a vacuum in the container 201, wherein a pressure of the container 201 is below $9 \times 10^{-2}$ mega-pascals (Mpa), and this pressure of the container 201 is maintained for at least 10 minutes; and (c24) applying an injection pressure on the hardenable liquid material 14 via the second inlet 203 of the material supply device 20, wherein the injection pressure approximately ranges from 0.001 Mpa to 10 Mpa.

In step (c3), the hardenable liquid material 14 is injected into the die 40 by the following substeps: (c31) opening the first valve 301 of the material input device 30 and the second valve 501 of the material output device 50; and (c32) under the injection pressure, the hardenable liquid material 14 in the container 201 entering the die 40 via the material supply device 30, and immersing the carbon nanotube film structure 12 for at least 10 minutes.

The viscosity of the hardenable liquid material 14 is low so that the hardenable liquid material 14 can permeate into the microporous structure of the carbon nanotube film structure 12. The remaining hardenable liquid material 14 discharges via the outlet 502 of the material output device 50. The air initially in the microporous structure is expelled due to the flowing hardenable liquid material 14, thereby avoiding or even preventing structural defects in the carbon nanotube composite 10 (see FIG. 4).

In a further or alternative embodiment, in step (c), the carbon nanotube film structure 12 can be dipped directly into a pool of the hardenable liquid material 14.

Figure 4:
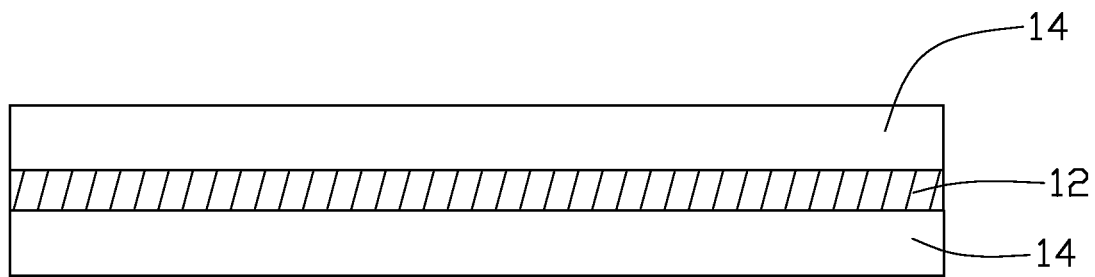
FIG. 4 is a schematic, side cross-sectional view of a carbon nanotube composite formed in accordance with the exemplary embodiment of FIG. 1.

Referring to FIG. 4, in step (d), the hardenable liquid material 14 is solidified by the following substeps: (d1) heating the hardenable liquid material 14 with the carbon nanotube film structure 12 to a predetermined temperature and maintaining the predetermined temperature for no more than 100 hours; and (d2) cooling the hardenable liquid material 14 to room temperature, thereby obtaining the carbon nanotube composite 10.

Step (d1) in this embodiment includes the following substeps: (d11) closing the first valve 301 of the material input device 30 and the second valve 501 of the material output device 50; and (d12) heating the die 40 by a heating device (not shown), and solidifying the hardenable liquid material 14. The temperature of the hardenable liquid material 14 is elevated gradually, in order to avoid implosion of the hardenable liquid material 14. The predetermined temperature at which the hardenable liquid material 14 solidifies is below 400° C. The heating device is selected from a group comprising of a heating plate, a thermocompressor, a baking oven, and a hotpress (i.e., hot-pressing apparatus).

Step (d2) in this embodiment includes the following substeps: (d21) heating the heating device to a temperature ranging from 50° C. to 70° C. for a period of about 1-3 hours; (d22)

heating the heating device to a temperature ranging from 80° C. to 100° C. for a period of about 1-3 hours; (d23) heating the heating device to a temperature ranging from 110° C. to 150° C. for a period of about 2-20 hours, whereby the hardenable liquid material 14 becomes solidified; and (d24) cooling the heating device to room temperature, taking the die 40 out from the heating device, and removing the combined carbon nanotube film structure 12 and hardened liquid material 14 from the die 40 to obtain the carbon nanotube composite 10.

Referring to FIG. 4, in this embodiment, the carbon nanotube composite 10 includes the hardened liquid material 14 and the carbon nanotubes of the carbon nanotube film structure 12. The carbon nanotubes are uniformly dispersed in the hardened liquid material 14 in the form of the carbon nanotube film structure 12.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A method for making a carbon nanotube composite, the method comprising:
   (a) forming a carbon nanotube film and placing the carbon nanotube film in a die;
   (b) providing a hardenable liquid material;
   (c) injecting the hardenable liquid material into the die to immerse the carbon nanotube film; and
   (d) solidifying the hardenable liquid material;
   wherein the die is sealed after the carbon nanotube film is placed into the die, and step (d) comprises:
      (d1) heating the die to a temperature ranging from about 50° C. to about 70° C. for a period of about 1 hour to about 3 hours;
      (d2) heating the die to a temperature ranging from about 80° C. to about 100° C. for a period of about 1 hour to about 3 hours;
      (d3) heating the die to a temperature ranging from about 110° C. to about 150° C. for a period of about 2 hours to about 20 hours; and
      (d4) cooling the die to room temperature.

2. The method of claim 1, wherein step (a) comprises:
   (a1) providing an array of carbon nanotubes; and
   (a2) pulling a carbon nanotube film from the array of carbon nanotubes.

3. The method of claim 1, wherein the carbon nanotube film comprises a plurality of carbon nanotube segments joined successively end-to-end by van der Waals attractive force therebetween; each of the plurality of carbon nanotube segments comprises a plurality of carbon nanotubes closely arranged and parallel to each other.

4. The method of claim 1, wherein at least two carbon nanotube films are provided and stacked with each other in step (a).

5. The method of claim 4, wherein each of the at least two carbon nanotube films comprise a plurality of carbon nanotubes oriented along the same direction, and an angle between alignment directions of the carbon nanotubes in any two adjacent carbon nanotube films range from about 0° to about 90°.

6. The method of claim 5, wherein the at least two carbon nanotube films define a plurality of micropores therein, and diameters of the plurality of micropores range from about 1 nanometer to about 500 nanometers.

7. The method of claim 1, wherein the hardenable liquid material comprises liquid-state thermosetting polymer and an additive; a mass ratio of the liquid-state thermosetting polymer to the additive ranges from about 7:3 to about 19:1.

8. The method of claim 7, wherein a viscosity of the liquid-state thermosetting polymer is less than 5 pascal-seconds.

9. The method of claim 7, wherein the liquid-state thermosetting polymer is selected from the group consisting of phenolic resin, epoxy resin, bismaleimide resin, triazine resin, polyimide, and polymethyl methacrylate.

10. The method of claim 7, wherein the additive is a solidifying agent; the solidifying agent is selected from the group consisting of aliphatic amine, aliphatic cyclic amine, aromatic amine, polyamide, acid anhydride, tertiary amine, and any combination thereof.

11. The method of claim 7, wherein the additive is a modifying agent; the modifying agent is selected from the group consisting of polysulphide rubber, polyamide resin, acrylonitrile rubber, and any combination thereof.

12. The method of claim 7, wherein the additive is a diluting agent; the diluting agent is selected from the group consisting of diglycidyl ether, polyglycidyl ether, butyl epoxy propyl ether 660, allylphenol, and any combination thereof.

13. The method of claim 7, wherein the additive is a filler; the filler is selected from the group consisting of asbestos fiber, glass fiber, quartz powder, aluminum oxide, and any combination thereof.

14. The method of claim 1, wherein step (c) comprises:
   (c1) disposing the hardenable liquid material in a container with a pressure below $9 \times 10^{-2}$ mega-pascals; and
   (c2) applying an injection pressure on the hardenable liquid material in a range from about 0.001 mega-pascals to about 10 mega-pascals to inject the hardenable liquid material into the sealed die.

15. A method for making a carbon nanotube composite, the method comprising:
   (a) providing a die and coating a stripping agent on an inner surface of the die;
   (b) providing a carbon nanotube film and placing the carbon nanotube film in the die;
   (c) providing a hardenable liquid material and introducing the hardenable liquid material into the die;
   (d) solidifying the hardenable liquid material in the die.

16. The method of claim 15, wherein step (c) comprises:
   (c1) disposing the hardenable liquid material in a container with a pressure below $9 \times 10^{-2}$ mega-pascals; and
   (c2) applying an injection pressure on the hardenable liquid material in a range from about 0.001 mega-pascals to about 10 mega-pascals such that the hardenable liquid material enter the die.

* * * * *